United States Patent
Knox

(10) Patent No.: US 10,889,231 B2
(45) Date of Patent: Jan. 12, 2021

(54) SECURITY PANEL FOR BULKHEAD

(71) Applicant: Ancra International LLC, Azusa, CA (US)

(72) Inventor: H. Thomas Knox, Cold Spring, KY (US)

(73) Assignee: ANCRA INTERNATIONAL LLC, Azusa, CA (US)

(*) Notice: Subject to any disclaimer, the term of this patent is extended or adjusted under 35 U.S.C. 154(b) by 160 days.

(21) Appl. No.: 16/023,169

(22) Filed: Jun. 29, 2018

(65) Prior Publication Data
US 2020/0001770 A1    Jan. 2, 2020

(51) Int. Cl.
| B60P 7/14 | (2006.01) |
| B60P 7/08 | (2006.01) |
| B62D 35/00 | (2006.01) |

(52) U.S. Cl.
CPC ............. B60P 7/14 (2013.01); B60P 7/0823 (2013.01); *B62D 35/001* (2013.01)

(58) Field of Classification Search
CPC  B60P 7/14; B60P 3/205; B60P 7/0892; B60P 7/135; B60P 7/15; B60P 3/40; B60P 7/0876; B60P 3/20; B60P 7/0815
USPC ... 410/129, 130, 140, 121, 135, 118, 24, 38, 410/150, 149, 145; 296/24.4, 24.41, 296/24.33, 39.2, 26.11, 26.09, 43, 10, 296/183.1
See application file for complete search history.

(56) References Cited

U.S. PATENT DOCUMENTS

| | | |
|---|---|---|
| 3,059,593 A | 10/1962 | Mack |
| 3,478,995 A | 11/1969 | Lautzenhiser et al. |
| 4,051,787 A | 10/1977 | Nishitani et al. |
| 4,345,734 A | 8/1982 | Studinger |
| 4,986,706 A * | 1/1991 | Williams, Jr. ............ B60P 7/14 410/129 |
| 5,375,534 A * | 12/1994 | Adams .................... B60P 7/135 105/372 |
| 5,979,876 A | 11/1999 | Cardona |
| 6,074,143 A | 6/2000 | Langston et al. |
| 6,742,974 B2 | 6/2004 | Haire |
| 6,895,867 B1 | 5/2005 | Burrows |
| 6,899,497 B2 | 5/2005 | Cardona et al. |
| 6,910,668 B2 | 6/2005 | Henning |
| 6,935,819 B2 | 8/2005 | Squyres |
| 6,981,828 B2 | 1/2006 | Davies et al. |

(Continued)

*Primary Examiner* — D Glenn Dayoan
*Assistant Examiner* — Sunsurraye Westbrook
(74) *Attorney, Agent, or Firm* — Brinks Gilson & Lione

(57) ABSTRACT

A bulkhead is provided. The bulkhead includes a panel that extends between first and second primary and secondary edges that are perpendicular to each other. The first primary edge includes a plurality of cutouts, and the second primary edge includes a first plurality of fingers and a second plurality of fingers. Each of the first plurality of fingers includes a first tongue extending from a first side of the second primary edge and away from a primary centerline and also includes a first groove extending from a second side of the second primary edge and toward the primary centerline. Each of the second plurality of fingers includes a second tongue extending from the second side of the second primary edge and away from the primary centerline and also includes a second groove extending from the first side of the second primary edge and toward the primary centerline.

20 Claims, 13 Drawing Sheets

(56) References Cited

U.S. PATENT DOCUMENTS

| | | |
|---|---|---|
| 7,065,840 B2 | 6/2006 | Profit |
| 7,100,971 B2 | 9/2006 | Pines |
| 7,188,817 B2 | 3/2007 | Henning |
| 7,293,813 B2 | 11/2007 | Squyres et al. |
| 7,357,610 B2 | 4/2008 | Squyres |
| D580,257 S | 11/2008 | Squyres |
| 7,578,644 B2 | 8/2009 | Squyres et al. |
| 7,634,841 B2 | 12/2009 | Profit |
| 7,681,286 B1 | 3/2010 | Lewis et al. |
| 7,731,462 B2 | 6/2010 | Squyres et al. |
| 8,172,494 B1 * | 5/2012 | Knox ................. B60P 7/15 410/143 |
| 8,356,963 B2 | 1/2013 | Frett |
| 8,740,526 B2 | 6/2014 | Knox |
| 8,757,944 B2 | 6/2014 | Calico |
| 8,820,008 B2 | 9/2014 | Knox |
| 9,090,191 B2 | 7/2015 | Squyres |
| 9,090,192 B2 | 7/2015 | Squyres |
| 9,180,807 B2 | 11/2015 | Squyres |
| 9,199,572 B2 | 12/2015 | Squyres |
| 9,359,015 B2 * | 6/2016 | Evans ............... E05D 5/0238 |
| 9,796,324 B2 * | 10/2017 | Daugherty .......... B60P 7/14 |
| 9,896,185 B2 * | 2/2018 | Cullen ............... B64C 1/20 |
| 2004/0156692 A1 | 8/2004 | Rhodes |
| 2015/0110568 A1 | 4/2015 | Squyres |
| 2015/0110570 A1 | 4/2015 | Squyres |
| 2016/0114717 A1 | 4/2016 | Squyres |

* cited by examiner

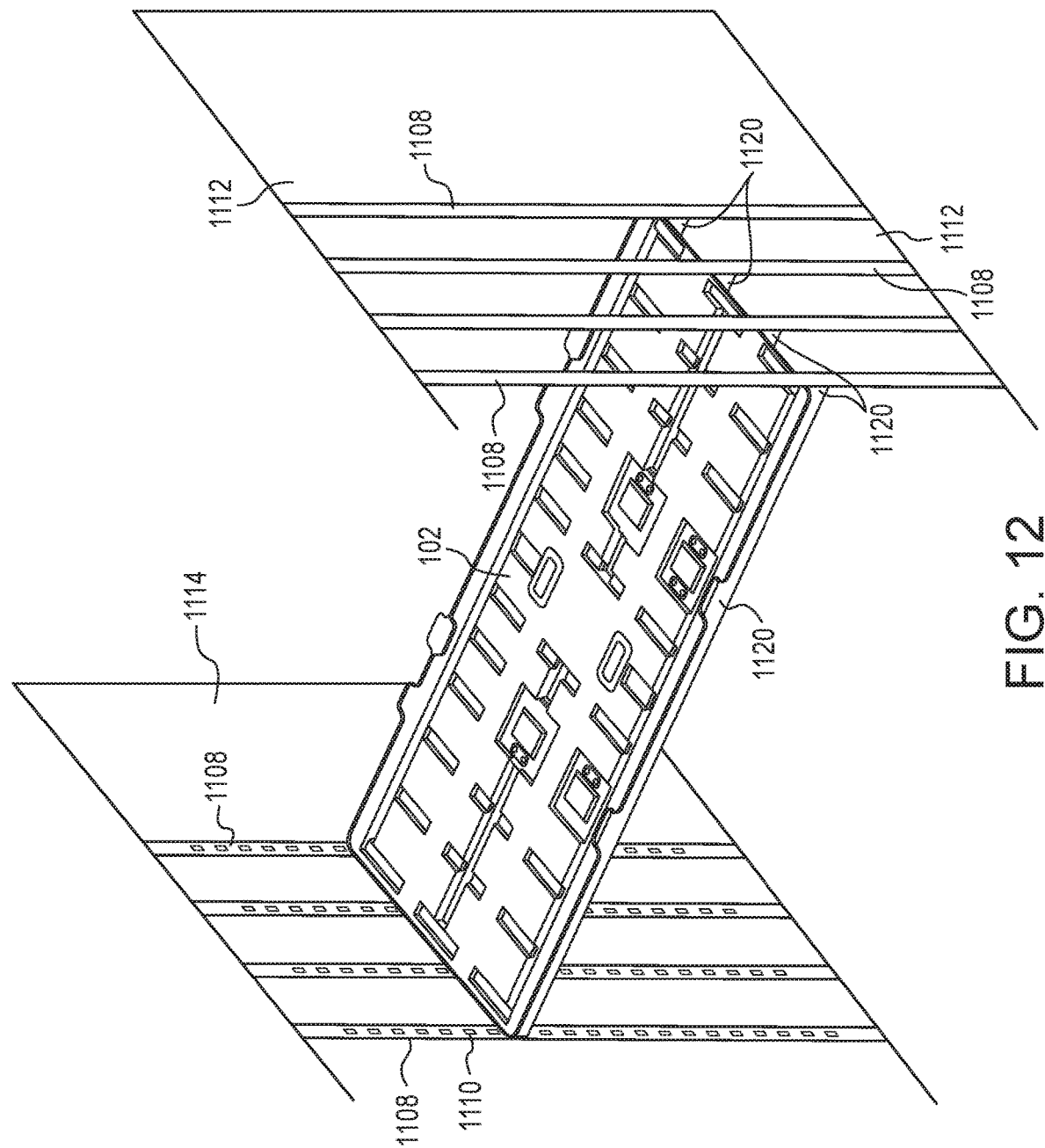

SECURITY PANEL FOR BULKHEAD

BACKGROUND

This application relates to removable bulkheads that can be used in an environment, such as a cargo compartment of a truck or related cargo compartments.

BRIEF SUMMARY

A first representative embodiment of the disclosure is provided. The embodiment includes a bulkhead. The bulkhead includes a first panel with a first side and a second side, the first side and second side fixed together, the first panel extends to parallel first and second primary edges and parallel first and second secondary edges, opposite ends of the first and second primary edges each meet an end of one of the first and second secondary edges, and each of the first and second primary edges is disposed perpendicular to each of the first and second secondary edges. The first primary edge includes a plurality of cutouts. The second primary edge includes a first plurality of fingers and a second plurality of fingers, each of the first plurality of fingers includes a first tongue extending from a first side of the second primary edge and away from a primary centerline that extends in parallel to and centered between the first and second primary edges, each of the first plurality of fingers includes a first groove extending from a second side of the second primary edge and toward the primary centerline, each of the second plurality of fingers includes a second tongue extending from the second side of the second primary edge and away from the primary centerline, and each of the second plurality of fingers includes a second groove extending from the first side of the second primary edge and toward the primary centerline. The first groove is configured to receive a projection shaped like the second tongue when a second panel like the first panel is disposed adjacent to and aligned with the first panel, and the second groove is configured to receive a projection shaped like the first tongue when the second panel like the first panel is disposed adjacent to and aligned with the first panel. The first side of the first panel supports a first plurality of brackets and a second plurality of brackets. Each of the first plurality of brackets and the second plurality of brackets includes an engaging portion that contacts the first side of the first panel and a cantilevered portion that establishes a space between the first side of the first panel and the cantilevered portion.

A second representative embodiment of the disclosure is provided. The embodiment includes a bulkhead. The bulkhead includes a first panel with a first side and a second side, the first side and second side fixed together, the first panel extends to parallel first and second primary edges and parallel first and second secondary edges, opposite ends of the first and second primary edges each meet an end of one of the first and second secondary edges, and each of the first and second primary edges is disposed perpendicular to each of the first and second secondary edges. The second primary edge includes a first plurality of fingers and a second plurality of fingers, each of the first plurality of fingers includes a first tongue extending from a first side of the second primary edge and away from a primary centerline that extends in parallel to and centered between the first and second primary edges, each of the first plurality of fingers includes a first groove extending from a second side of the second primary edge and toward the primary centerline, each of the second plurality of fingers includes a second tongue extending from the second side of the second primary edge and away from the primary centerline, and each of the second plurality of fingers includes a second groove extending from the first side of the second primary edge and toward the primary centerline. The first groove is configured to receive a projection shaped like the second tongue when a second panel like the first panel is disposed adjacent to and aligned with the first panel, and the second groove is configured to receive a projection shaped like the first tongue when the second panel like the first panel is disposed adjacent to and aligned with the first panel. The first primary edge includes a plurality of cutouts. The first side of the first panel supports a first plurality of brackets and a second plurality of brackets, each of the first and second plurality of brackets is configured, in use, to selectively receive a respective first strap and a second strap therein.

Advantages of the present disclosure will become more apparent to those skilled in the art from the following description of the preferred embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

BRIEF DESCRIPTION OF THE DRAWINGS

FIG. 12 is a simplified schematic perspective view of a panel of FIG. 1 disposed horizontally upon four decking beams that are fixed within the cargo container.

DETAILED DESCRIPTION OF THE DRAWINGS AND THE PRESENTLY PREFERRED EMBODIMENTS

Figure 11:
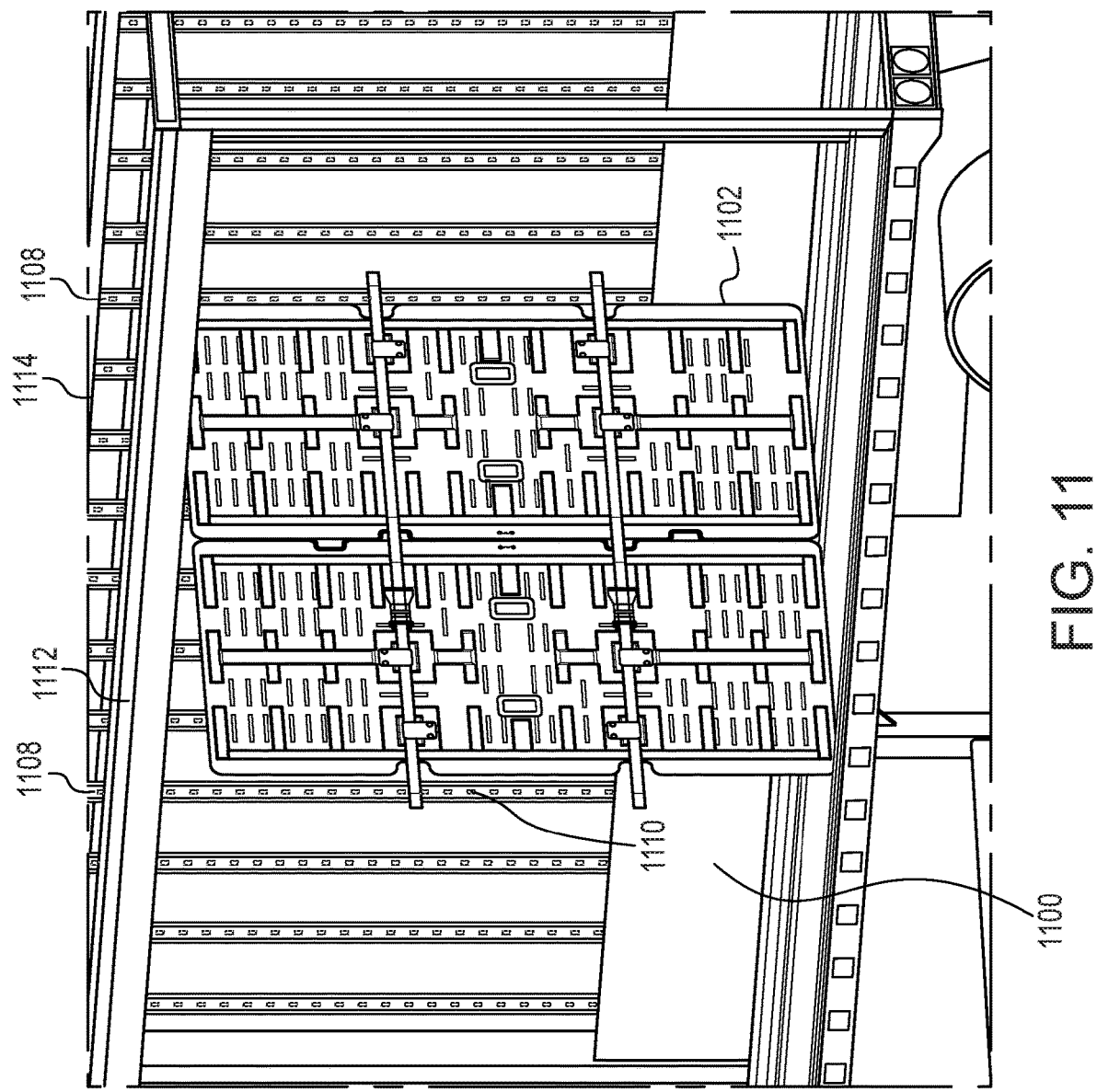
FIG. 11 is a perspective view of the bulkhead of FIG. 6 disposed vertically in a cargo container.

Turning now to FIGS. 1-12, a bulkhead 100 is provided. The bulkhead 100 is formed by a first panel 102, and in some embodiments two or more identical panels 102. The bulkhead 100 is configured to be disposed within an environment 1100, such as a cargo compartment of a truck, or in other structures in the cargo or transportation industry, such as aircraft, railcars, boats, multiunit storage facilities, warehouses and distribution centers or the like. As depicted in FIG. 11, the bulkhead 100 is configured to be disposed in a first position 1102 where the bulkhead 100 is disposed in a vertical configuration to separate environment 1100 to two different compartments. As depicted in FIG. 12, the bulkhead 100 is configured to be disposed in a second position where one or more of the panels 102 that form the bulkhead 100 are disposed horizontally to serve as horizontal decking surface within the cargo compartment.

Figure 1:
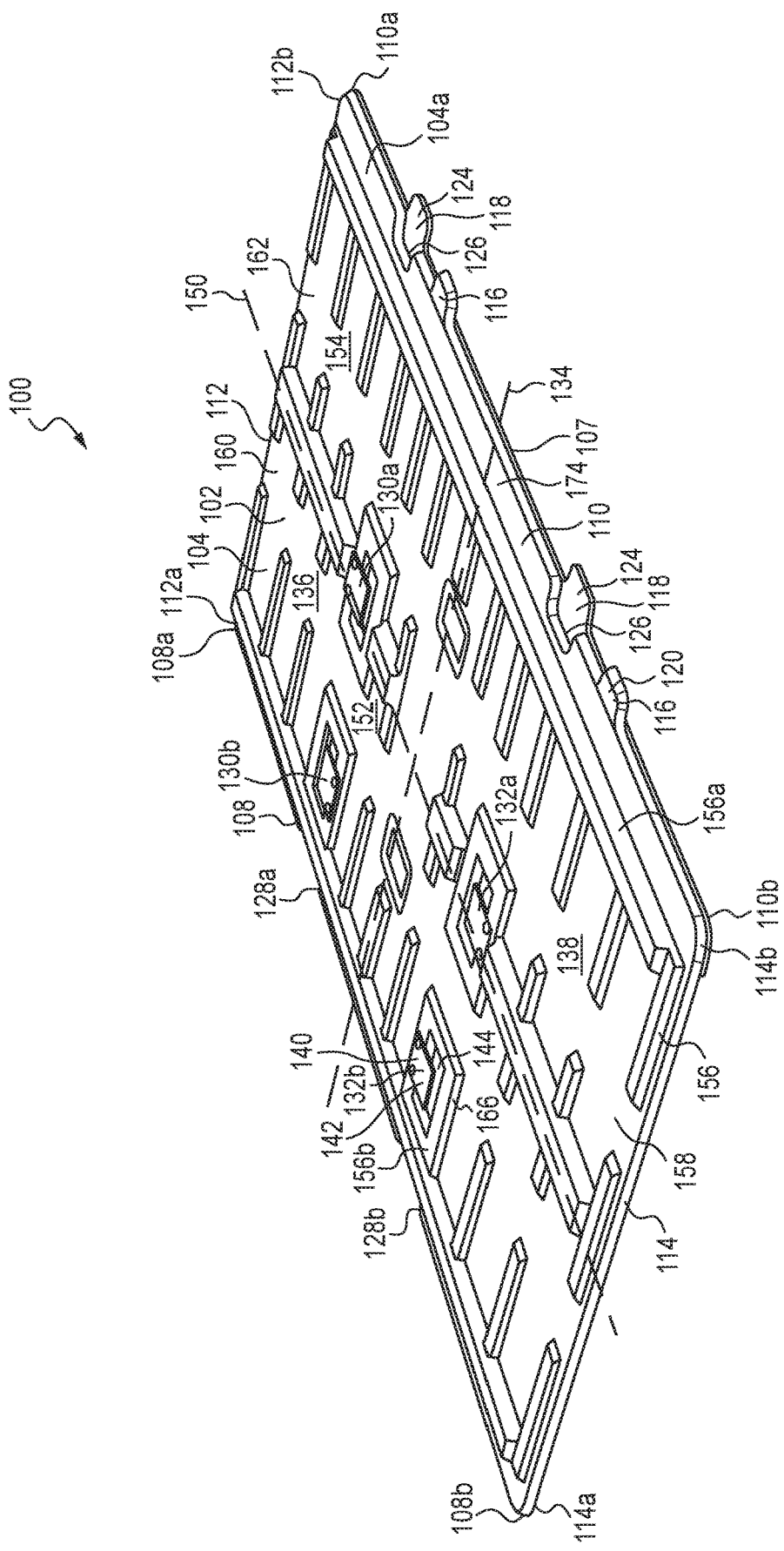
FIG. 1 is a perspective view of a panel that is used to construct a bulkhead.
Figure 3:
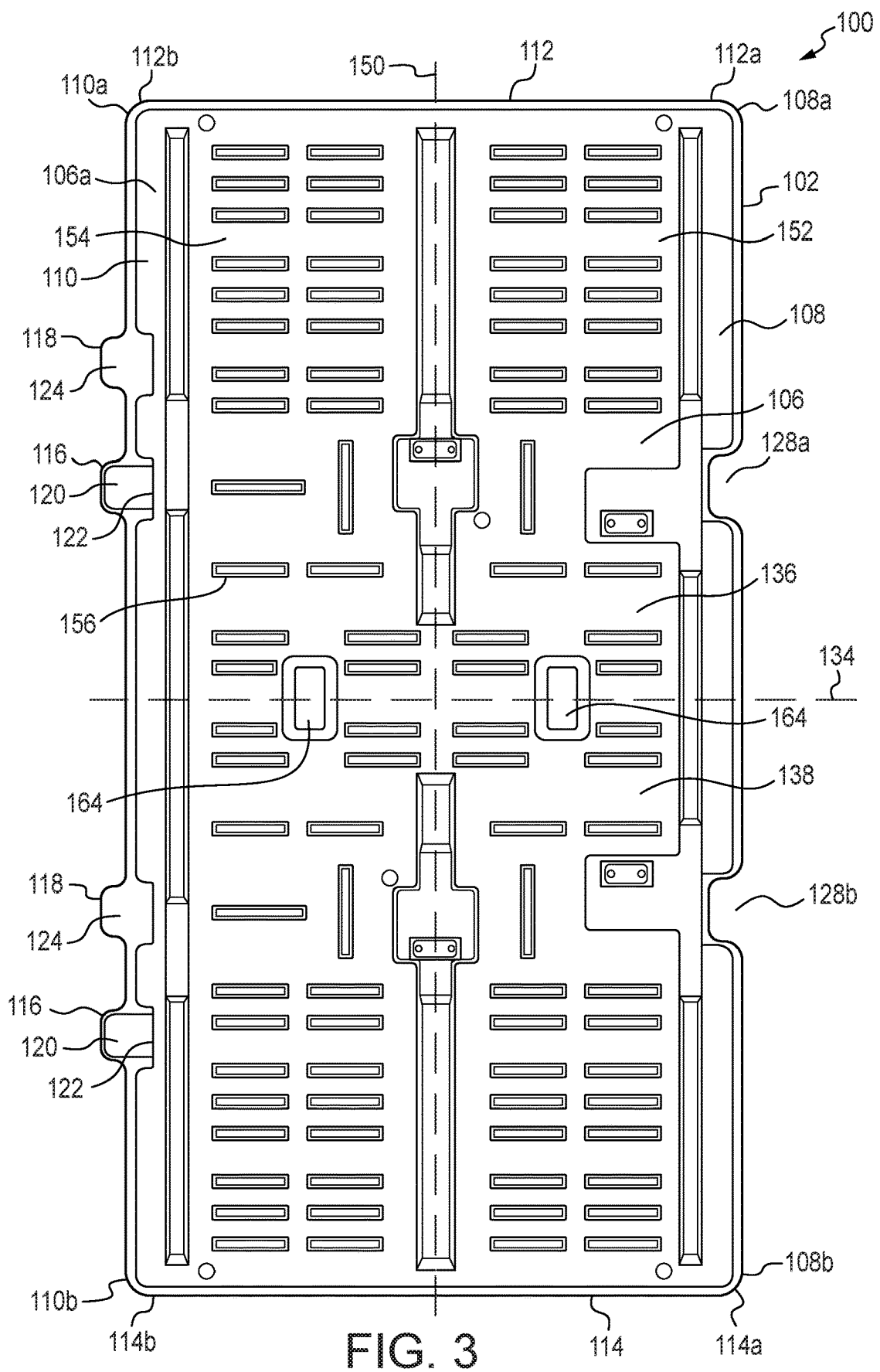
FIG. 3 is a back view of the panel of FIG. 1.
Figure 4:
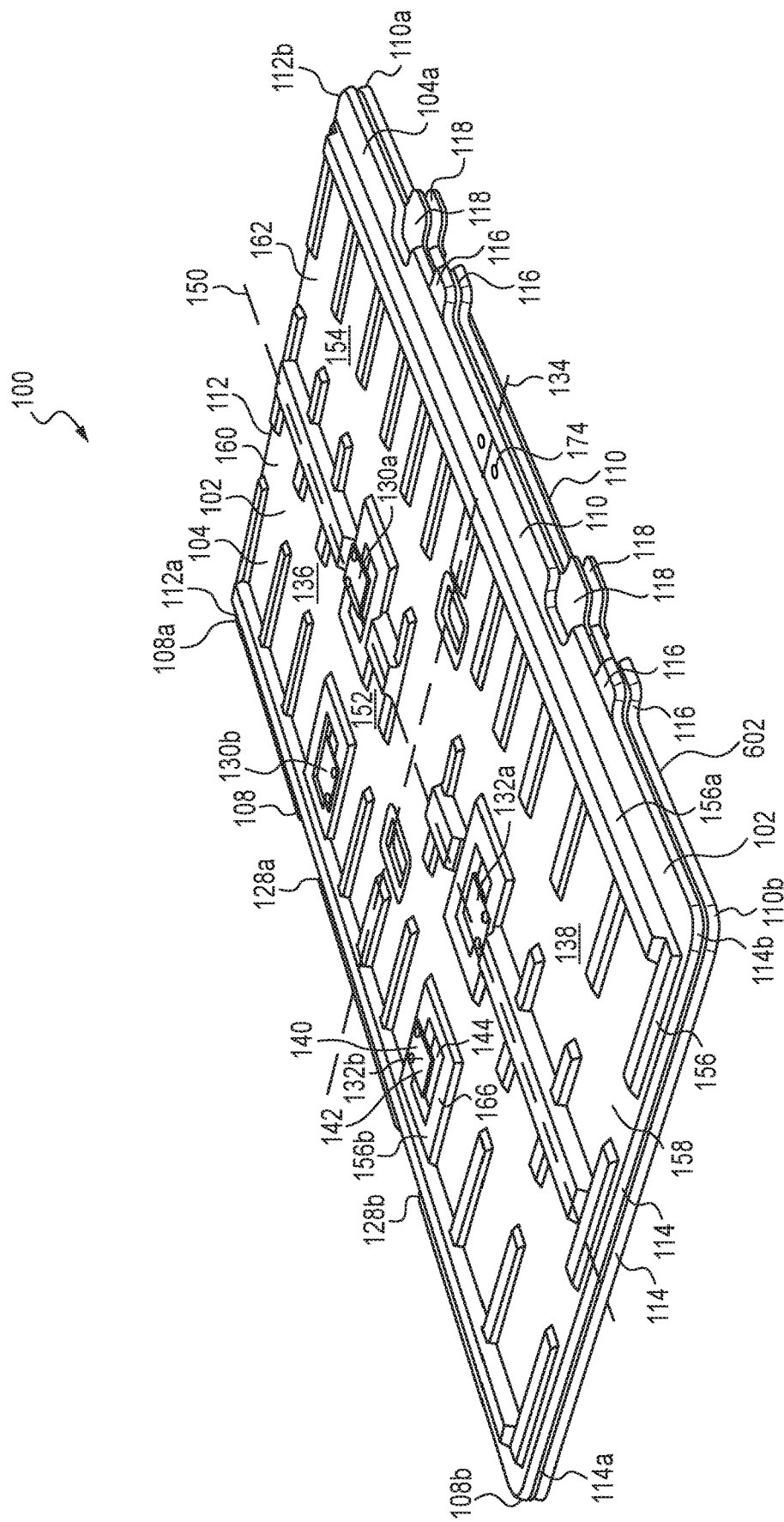
FIG. 4 is a perspective view of two panels of FIG. 1 stacked together.
Figure 5:
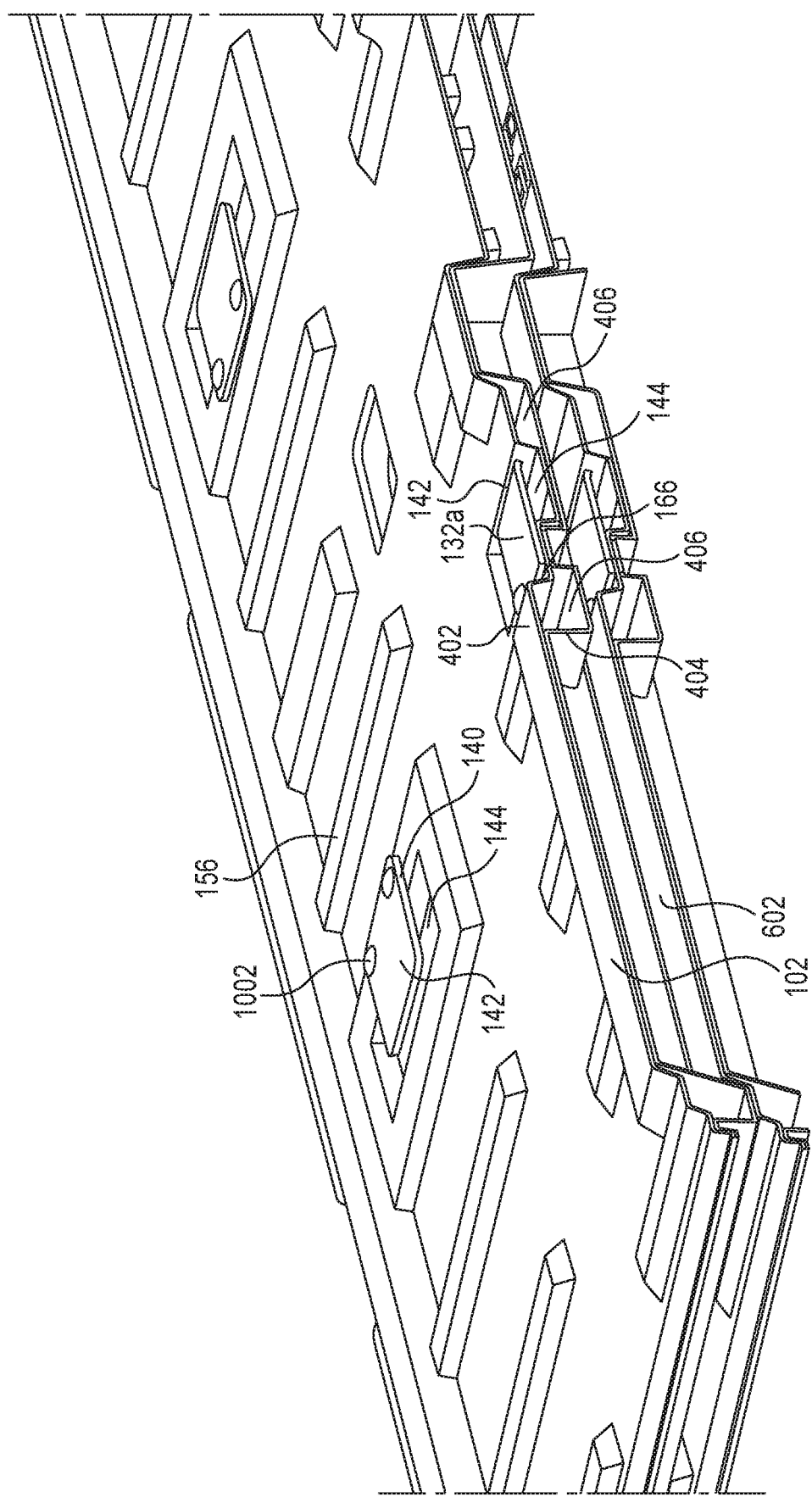
FIG. 5 is a cross-sectional view of two panels of FIG. 1 stacked together.

The first panel 102 is best shown in FIGS. 1-5. The first panel 102 may be formed from a single sheet, such as a single sheet of plywood or a single sheet of plastic or composite material. Referring to FIG. 5, in some embodiments, the first panel 102 may be formed from two or more sheets 402, 404. To form the panel, the sheets 402, 404 may be formed using molds and combined by fusion through a conventional thermoforming process. (at least along the edges 108, 110, 112, 114 (discussed below), but in some embodiments at other positions within the panel). The seams along the edges of the panel are best shown in FIG. 1, and the seams at other positions of the panel are best shown in FIG. 5. The thermoforming process facilitates molding of the required contours into the separate top and bottom sheets. Typically, the two or more sheets are made from high-density polyethylene (HDPE), or the like, and/or from fully recyclable material. In some embodiments, the separate thermoformed sheets may be made from materials that have one or both of: a) different durability; and b) different frictional characteristics to exploit these properties.

Referring to FIG. 11, the vertically installed bulkhead 100 may be formed by a single first panel 102 or two or more identical panels 102. In embodiments where the bulkhead 100 is made of a single first panel 102, the first panel 102 may be square and be about 96 inches long on all four sides, which is only slightly smaller than the height and width of a typical cargo compartment of a truck. In embodiments where two panels 102 are provided to form the bulkhead 100, each first panel 102 has a height of about 96 inches, to allow the first panel 102 to extend from the floor of the cargo compartment to close to the ceiling, and a width of about 48 inches, so that two panels 102 disposed in a side by side manner collectively span 96 inches. The term "about" is specifically defined herein to include the specific value referenced as well as a dimension that is within 5% of the dimension both above and below the dimension. In this configuration, the primary edges 108, 110 of the first panel 102 are each about 96 inches long and the secondary edges 112, 114 are each about 48 inches long. The term "primary" is used herein to refer to the longer dimension of the first panel 102 for panels that are not square. The term "secondary" is used herein to refer to the edges and axes that are perpendicular to the "primary" edges. One of ordinary skill in the art will understand that the dimensions of the bulkhead 100 and the components that form the bulkhead 100 are described with reference to a truck cargo compartment that is about 96 inches wide, and that the bulkhead 100 discussed herein can be used for other purposes, and the changes in the size, shape, and orientation of the components of the bulkhead 100 to be used for the other purposes could be easily made by routine optimization and without undue experimentation.

In some embodiments, the first panel 102 could be configured to be positioned horizontally (with two or more stacked panels) to form the bulkhead. In that case, the "primary valleys" would receive the beams therethrough (per the naming convention discussed above) because the valleys in that direction would be in parallel to the long side of the panel.

As shown in FIGS. 11 and 12, the 48 inch width of the first panel 102 allows the first panel 102 to rest horizontally upon and be supported by four horizontal fixed beams (such as conventional "E" decking beams) that are spaced at 16 inch centers. In this configuration, the first panel 102 is positioned such that two beams (not shown in FIG. 12) are disposed at 16 inch centers across the first side 104 of the first panel 102 and extending within primary valleys 160, 162, with each beam spaced 8 inches outboard of the primary centerline 150 (discussed below) of the first panel 102, and two other beams (not shown in FIG. 12) are disposed below the first primary edge 108 and the second primary edge 110, respectively. In this configuration, the first panel 102 is preferably oriented such that the first and second primary edges 108, 110 of the first panel 102 are disposed upon half of the width, or slightly less than half of the top surface of the respective beam such that a second horizontal panel 602 like the first panel 102 mounted next to the first panel 102 can rest upon the other portion of the top surface of the beam. One of ordinary skill in the art will understand with a thorough review of this specification that the first panel 102 may rest upon differing numbers of beams, such as two or three.

In embodiments where the first panel 102 is supported by decking beams 1120 (FIG. 12), opposite ends of the beams may each be supported by opposite tracks 1108 (with periodic apertures 1110 for receiving a locking element of a beam) that may be mounted upon opposite sidewalls 1112, 1114 of the environment 1100, such as the sidewalls of a cargo container. The tracks 1108 may be conventional logistics tracks (with apertures 1110 to receive a locking element from a beam), such as E tracks which may be disposed vertically upon the inner surface of the cargo compartment at equal intervals, such as every 16 inches. Alternatively, tracks could be mounted horizontally upon the sidewalls. In embodiments where the first panel 102 and a second panel 602 (like the first panel 102) are disposed vertically in a side by side manner to form the bulkhead 100 (e.g., FIG. 11), the bulkhead 100 may be secured in place by straps or other flexible connection structures that extend across the bulkhead and beyond the cutouts (discussed below) of the two panels. In this configuration, opposite ends of the straps or other flexible connection structures may each be fixed to opposite tracks 1108 (with periodic apertures 1110 for receiving a portion of the ends of the straps or other flexible connection structures) that may be mounted upon opposite sidewalls 1112, 1114 of the environment 1100, such as the sidewalls of a cargo container.

Figure 2:
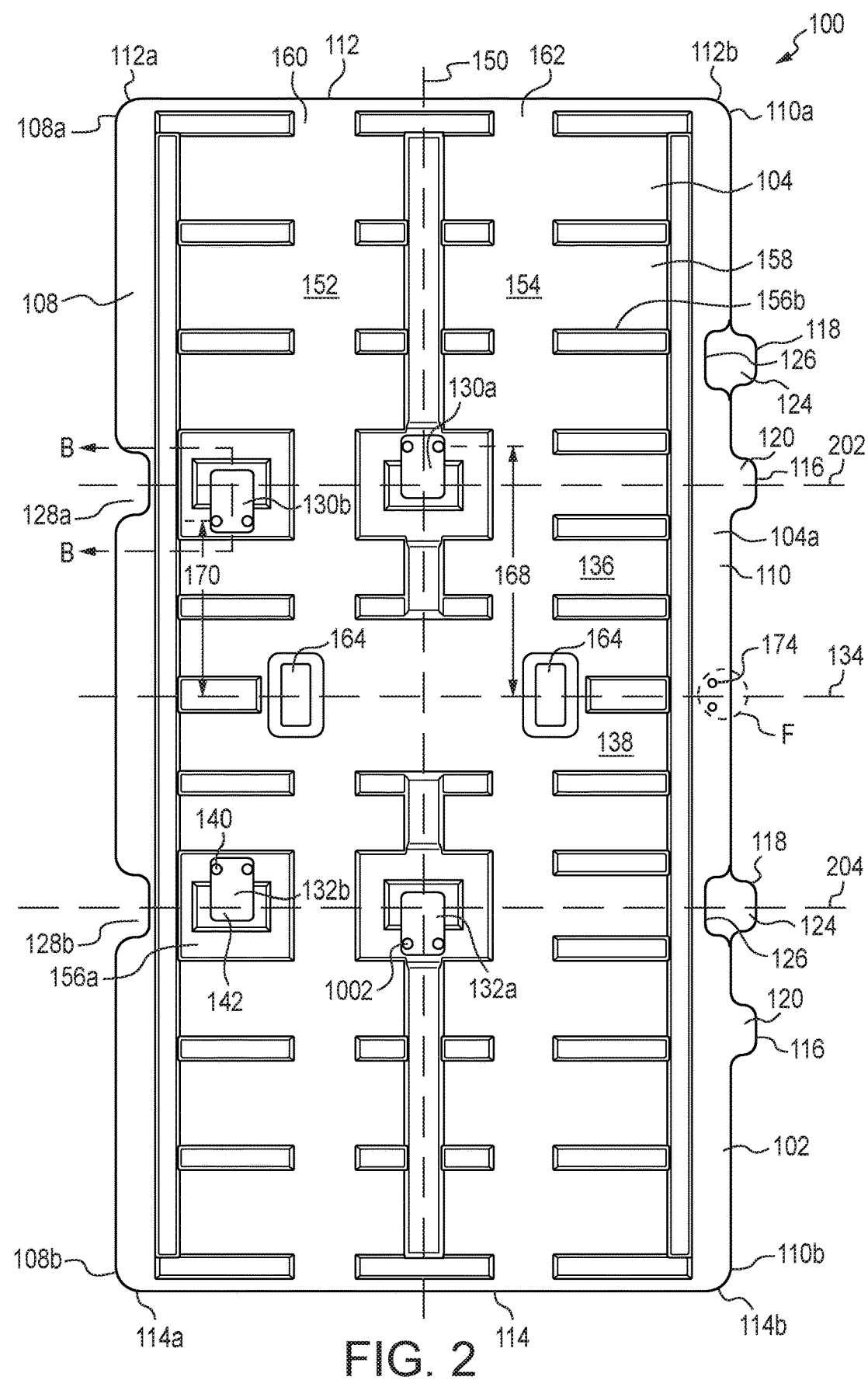
FIG. 2 is a top view of the panel of FIG. 1.
Figure 8:
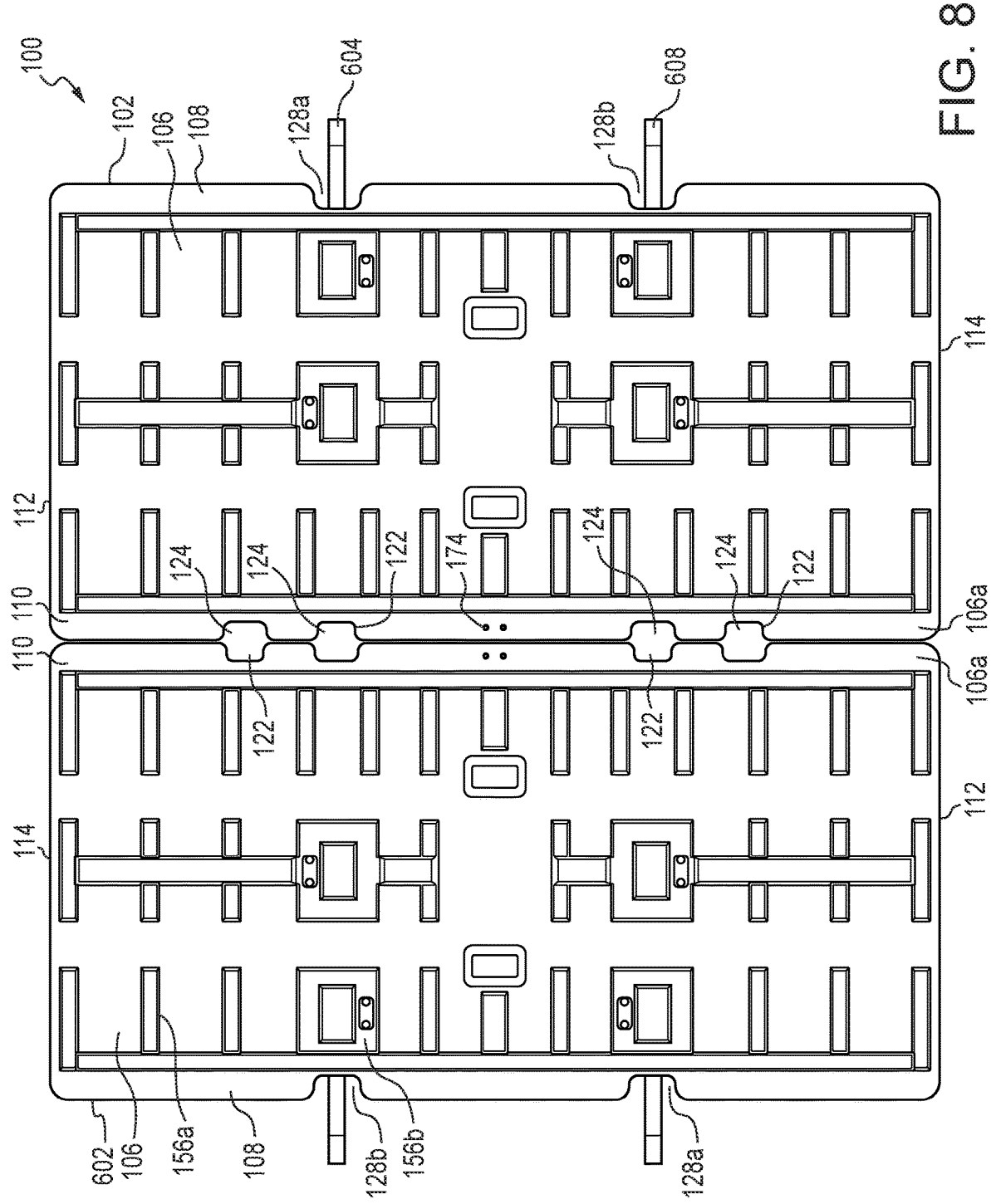
FIG. 8 is a back view of the bulkhead of FIG. 6.

Referring back to FIGS. 1-5, with the two sheets 402, 404 combined, one or more voids 406 are defined therebetween, which may be hollow, or partially or completely filled with a filler material or a structural material, such as reinforcement ribs or other structures, for strength, stiffness, or other purposes. The sheets 402, 404 may be strategically fused by forming discrete portions of each sheet 402, 404 against each other to define elongate extensions, such as ribs 156. In some embodiments, the lengths of at least some of the ribs 156 are disposed orthogonally to each other. The transverse arrangement of the lengths of the ribs 156 affords greater multidirectional reinforcement. The first panel 102 may be designed with ribs 156 that have different lengths and positioning. One of ordinary skill in the art would understand, after a thorough review of this specification, that the length, size, and positioning of the ribs 156 is based upon the desired rigidity and strength of the first panel 102, as well as the desired placement of primary valleys 160, 162 and brackets 130, 132 (discussed below). The second side 106 of the first panel 102 may have a same rib arrangement as the first side 104 of the first panel 102 (e.g., FIG. 8) or a different rib arrangement than the first side 104 of the first panel 102 (e.g., FIG. 3). The sample ribs 156 in FIGS. 1, 3, and 8 are depicted for understanding purposes, and the actual first panel 102 may have additional ribs 156 of this or a different design. In some embodiments, the ribs 156 may be monolithically formed with the surface of the first panel 102, while in other embodiments, the ribs 156 may be fixed onto the surface of the first panel 102 with fasteners, adhesive, a key/keyway, a joint, or other locking structures known in the art. The ribs 156 may have alignment features to create one or more primary valleys 160, 162 to align the first panel 102 upon beams when the first panel 102 is used as a decking panel (as discussed herein and shown in FIG. 12).

Referring to FIG. 1, the first panel 102 includes a first side 104 and a second side 106. When the first panel 102 is installed vertically to form the bulkhead 100 within the environment, such as a cargo compartment of a truck (e.g., FIG. 11), the first side 104 normally faces the rear door of the cargo compartment, or at least the separated space that will have personnel access into once the bulkhead 100 is installed. When the bulkhead 100 forms a space where there will be no personnel access, the second side 106 of the bulkhead 100 normally faces that unoccupied space.

The first panel 102 is defined by a first primary edge 108, an opposite second primary edge 110, a first secondary edge 112, and an opposite second secondary edge 114. The first and second primary edges 108, 110 are parallel and run vertically when the first panel 102 is disposed vertically (e.g., FIG. 11). The first and second secondary edges 112, 114 are parallel and run horizontally when the first panel 102 is disposed vertically (e.g., FIG. 11). By convention, the second secondary edge 114 normally rests upon, or is proximate to, the floor of the cargo compartment when the panel 102 is installed vertically. The first and second primary edges 108, 110 extend to primary ends 108a, 108b, 110a, 110b, and the first and second secondary edges 112, 114 extend to secondary ends 112a, 112b, 114a, 114b that meet with the respective primary ends of the intersection primary edges 108, 110.

Each of the primary and secondary edges 108, 110, 112, 114 includes a planar portion that extends for a certain width, such as at about 1.5 inches, or in other embodiments within a range of about 1 inch to about 3 inches, inclusive of all lengths within this range. The planar portion of each edge is configured to rest upon a surface of a decking beam to support the first panel 102 upon the decking beam at the edges of the panel as shown in FIGS. 11-12. In some embodiments, the planar portion of each edge extends through the same plane. In some embodiments, the planar portions of the edges each extend through the same plane as the surface of primary valleys 160, 162 (discussed elsewhere herein) upon the first side 104, such that the first panel 102 rests horizontally upon several decking beams that are aligned at the same height (e.g., FIG. 12).

The first side 104 of the first panel 102 includes a plurality of ribs 156 that extend outwardly from a planar surface 158 of the first side 104 of the first panel 102. The ribs 156 are sized and distributed to define the planar portions of the edges 108, 110, 112, and 114 discussed above and one or more of the valleys 160, 162 discussed elsewhere herein. In some embodiments, some ribs 156 (designated as 156a in FIG. 1) may be straight, while other ribs 156 (designated as 156b in FIG. 1) may have multiple straight components that extend from each other (such as forming a shape like a letter "L", a letter "E", a letter "C", a shape "⊔", or the like). As shown in FIG. 1, the ribs 156 may include portions that are generally perpendicular to each other, but in other embodiments, the ribs 156 themselves, or portions of the ribs may be curved. One of ordinary skill in the art will understand with a thorough review of this specification that the ribs 156 may be configured and aligned upon the first side 104 of the first panel 102 for strength purposes as well as to define the valleys 160, 162 as desired.

As shown in FIG. 1, the first panel 102 may include two or more primary valleys 160, 162 (named "primary" because they are parallel to the primary edges 108, 110) that extend between the first and second secondary edges 112, 114 and are each parallel to the first and second primary edges 108, 110 and/or to a primary centerline 150 of the first panel 102. The primary centerline 150 extends between the first and second secondary edges 112, 114 and in parallel to and centered by the first and second primary edges. The primary valleys 160, 162 may be positioned on opposite sides of the primary centerline 150 and in some embodiments disposed equidistant from the primary centerline 150.

In some embodiments, the second side 106 of the first panel 102 may include a plurality of ribs and/or valleys (similar to (e.g., FIG. 8) or different from (e.g., FIG. 3) the structure, geometry, and arrangement of the ribs 156 and/or valleys 160, 162 discussed and depicted with respect to the first side 104 of the first panel 102), which may be provided for stacking purposes, for strength purposes, for weight purposes, or for other reasons upon the first panel 102.

In some embodiments, the first panel 102 may include one or more slots 164, which may be used for grabbing and holding onto the first panel 102 for ergonomic reasons. The slots 164 may be provided at convenient locations within the first panel 102, and are normally sized big enough to allow a user's fingers to engage the slots, but small enough to prevent objects from being passed through the first panel 102 when installed as a bulkhead. In some embodiments, as shown in FIGS. 1-3, the first panel 102 may include two slots 164 that are disposed on opposite sides of the primary centerline 150 and aligned along a secondary centerline 134. The secondary centerline 134 extends between the first and second primary edges 108, 110 and in parallel to the first and second secondary edges 112, 114.

As shown in FIGS. 2 and 3, the first primary edge 108 may include a plurality of cutouts 128. In some embodiments where the plurality of cutouts 128 include two cutouts 128a and 128b, as shown in FIGS. 2-3, the two cutouts are disposed on opposite sides of the secondary centerline 134. Each cutout may have a cutout thickness that is equal to the thickness of the first primary edge 108. In some embodiments, the first cutout 128a and the second cutout 128b are disposed equidistant from the secondary centerline 134. This configuration allows the first cutout 128a of the first panel 102 and the second cutout 128b of a second panel 602 (like the first panel 102) to be aligned along the first line 202 of the first panel 102 when the second panel 602 is disposed adjacent to and aligned with the first panel 102, and the second panel 602 is positioned such that a second primary edge 110 of the second panel 602 is adjacent to the second primary edge 110 of the first panel 102, with first sides 104 of each of the first and second panels 102, 602 extending along a same plane, and the first secondary edge 112 of the first panel 102 aligned collinearly with a second secondary edge 114 of the second panel 602. When the first panel 102 and the second panel 602 are installed vertically in a side by side manner to form the bulkhead 100 (e.g., 11A in FIG. 11), the cutouts provide space for the user to manipulate the fittings on the ends of the straps to fix to and remove from opposite tracks 1108 (with periodic apertures 1110 for receiving a portion of the strap) that may be mounted upon opposite sidewalls 1112, 1114 of the environment 1100, such as the sidewalls of a cargo container.

The first side 104 of the first panel 102 may also include at least a first plurality of brackets 130 and a second plurality of brackets 132 that are mounted thereupon. The first and second plurality of brackets 130, 132 may be disposed on opposite sides of the secondary centerline 134. In some embodiments, as shown in FIGS. 1-2, the first plurality of brackets 130 are located in a row on the first side 136 of the secondary centerline 134, and the second plurality of brackets 132 are located in a row on the second side 138 of the secondary centerline 134. The brackets are provided for receiving straps or other flexible connection structures that extend therethrough such that the first panel 102 can be secured vertically to serve as the bulkhead 100 (e.g, FIG. 11). The number of rows of brackets supported by the first side 104 of the first panel 102 may vary depending upon the length (along a direction parallel to the primary centerline 150), the width (along a direction parallel to the secondary centerline 134), and the weight of the first panel 102. For example, as the length/width/weight of the first panel 102 increases, a greater number of rows of brackets may be provided such that additional straps (or the like) may be received by the brackets in order to secure the first panel 102 vertically.

At least a portion of each bracket of the first plurality of brackets 130 and a portion of the first cutout 128a are aligned along the first line 202. At least a portion of each bracket of the second plurality of brackets 132 and a portion of the second cutout 128b are aligned along the second line 204. The first and second lines 202, 204 are each disposed in parallel to the secondary centerline 134 and disposed equidistant from the secondary centerline 134. This configuration allows the first plurality of brackets 130 of the first panel 102 and the second plurality of brackets 132 of the second panel 602 (like the first panel 102) to be aligned along the first line 202 of the first panel 102 when the second panel 602 is disposed adjacent to and aligned with the first panel 102, and the second panel 602 is positioned such that the second primary edge 110 of the second panel 602 is adjacent to the second primary edge 110 of the first panel 102, with first sides 104 of each of the first and second panels 102, 602 extending along a same plane, and the first secondary edge 112 of the first panel 102 aligned collinearly with the second secondary edge 114 of the second panel 602

The first and second plurality of brackets 130, 132 may each include at least two brackets. For example, as shown in FIGS. 1-2, the first plurality of brackets 130 may include two brackets 130a, 130b, and the second plurality of brackets 132 may include two brackets 132a, 132b. The number of brackets included in each row of brackets may vary depending upon the width of the first panel 102. As the width of the first panel 102 increases, a greater number of brackets aligned in a row may be provided such that the strap extending along the row may be received by the brackets at more locations along the row in order to provide more stability to the first panel 102 when secured vertically.

In embodiments where each row of brackets includes two brackets, each of the two brackets within a row may be disposed upon opposite sides of the primary centerline 150 or may be disposed on the same side of the primary centerline 150. In some embodiments, one of the brackets within each row of brackets may be disposed on the primary centerline 150. For example, as shown in FIGS. 1-2, two brackets 130b and 132b from the two rows respectively may be disposed on a first side 152 of the primary centerline 150, and the other two brackets 130a, 132a from the two rows respectively may be disposed on the primary centerline 150. The brackets may be positioned to not interfere with the primary valleys 160, 162 to allow the first panel 102 to rest horizontally over beams so that the beams extend through the primary valleys 160, 162. In embodiments where each row of brackets includes three or more brackets, the brackets may be spaced along the length of the row so that when the first panel 102 is installed vertically as a bulkhead, the brackets within a row may engage a respective strap at different positions along the length of the strap.

In some embodiments, at least one bracket of the first plurality of brackets 130 and at least one bracket of the second plurality of brackets 132 are disposed within a column and along a line that is parallel to the first and second primary edges 108, 110. For example, as shown in FIGS. 1-2, the brackets 130a and 132a are disposed along the primary centerline 150, and the brackets 130b and 132b are disposed along a line that extends in parallel to the primary centerline 150 on the first side 152 of the primary centerline 150.

In some embodiments, the first and second plurality of brackets each are constructed the same. The brackets are best understood with reference FIGS. 1-2, 5-7, and 10. Each bracket includes an engaging portion 140 and a cantilevered portion 142. The engaging portion 140 is configured to rest upon, or mate with the surface of the first side 104 of the first panel 102 and be fixed thereto, such as with one or more fasteners 1002 (as depicted in the figures, e.g., FIG. 10) and/or be fixed to the first side 104 of the first panel 102 with adhesive, a keyed structure, a press fit, or other connection structures that are known in the art.

In some embodiments, the cantilevered portion 142 may extend from the engaging portion 140 over at least a portion of the first side 104 of the first panel 102 and establishes a space 144 between the first side 104 of the first panel 102 and the cantilevered portion 142. The space 144 is configured to selectively receive a portion of a strap between the cantilevered portion 142 and the first side 104 of the first panel 102. The space 144 is also configured to allow a strap to extend across the first panel 102 through the spaces 144, such that the strap is engaged or closely surrounded by the bracket and the panel's surface.

In some embodiments, the bracket may be a flat plate with the engaging portion 140 and the cantilevered portion 142 extending along a same plane that is parallel to the planar surface 158 of the first side 104 of the first panel 102. In this configuration, the engaging portion 140 may rest upon a rib such that the cantilevered portion 142 may extend from the engaging portion 140 over a portion of the distance between the first rib that the engaging portion 140 is fixed thereupon and an adjacent second rib that extends in parallel to the first rib. The space 144 may be formed between the cantilevered portion 142 and the planar surface 158 of the first side 104 of the first panel 102. Depending upon the anticipated size of the strap (or the anticipated range of sizes of straps), the size of the space 144 may be varied by varying the geometry of the panel (e.g., the height of the rib 156) in order to result in a suitable space between the cantilevered portion 142 and the planar surface 158 of the first side 104 of the first panel 102 to receive a strap within the space 144. One of ordinary skill in the art with a thorough review of this specification would understand that it would be readily possible within the scope of this disclosure to modify the height of the rib 156 and/or the size and shape of the bracket so that a suitable space may be formed between the cantilevered portion 142 and the planar surface 158 of the first side 104 of the first panel 102 to receive a strap within the space 144.

The engaging portion 140 of each brackets may be fixed to the first side 104 of the first panel 102 in a position and orientation such that the cantilevered portion 142 extends from the engaging portion 140 in a desired orientation. In some embodiments where each row of brackets includes two brackets, the cantilevered portion 142 of each bracket of the two brackets within a row may extend from the respective engaging portion 140 in opposite directions. For example, as shown in FIGS. 1-2, the first plurality of brackets 130 disposed on the first side 136 of the secondary centerline 134 include two brackets 130a, 130b. The engaging portions 140 of the brackets 130a and 130b are respectively fixed on ribs that are parallel to each other, with the rib that the bracket 130a is fixed onto located further away from the secondary centerline 134 than the rib that the bracket 130b is fixed onto. In this configuration, the cantilevered portion 142 of the bracket 130a extends towards the secondary centerline 134, thereby creating a space between the cantilevered portion 142 of the bracket 130a and the planar surface 158, and the space is located between the engaging portion 140 of the bracket 130a and the secondary centerline 134. The cantilevered portion 142 of the bracket 130b extends away from the secondary centerline 134, thereby creating a space between the cantilevered portion 142 of the bracket 130b and the planar surface 158, and the space is located between the engaging portion 140 of the bracket 130b and the first secondary edge 112. At least a portion of the first cutout 128a and a portion of the spaces created by the cantilevered portions 142 of the brackets 130a and 130b are aligned along the first line 202 such that a first strap 604 received within the spaces may extend across the first panel 102 along the first line 202, and such that opposite ends of the first strap 604 may extend beyond the first cutout 128a and the second primary edge 110 to be fixed to opposite tracks 1108 that are mounted upon sidewalls 1112, 1114.

As of another example, as shown in FIGS. 1-2, the second plurality of brackets 132 disposed on the second side 138 of the secondary centerline 134 include two brackets 132a, 132b. The engaging portions 140 of the brackets 132a and 132b are respectively fixed on ribs that are parallel to each other, with the rib that the bracket 132a is fixed onto located further away from the secondary centerline 134 than the rib that the bracket 132b is fixed onto. In this configuration, the cantilevered portion 142 of the bracket 132a extends towards the secondary centerline 134, thereby creating a space between the cantilevered portion 142 of the bracket 132a and the planar surface 158, and the space is located between the engaging portion 140 of the bracket 132a and the secondary centerline 134. The cantilevered portion 142 of the bracket 132b extends away from the secondary centerline 134, thereby creating a space between the cantilevered portion 142 of the bracket 132b and the planar surface 158, and the space is located between the engaging portion 140 of the bracket 132b and the second secondary edge 114. At least a portion of the second cutout 128b and a portion of the spaces created by the cantilevered portions 142 of the brackets 132a, 132b are aligned along the second line 204 such that a second strap 606 received within the spaces may extend across the first panel 102 along the second line 204, and such that opposite ends of the second strap 606 may extend beyond the second cutout 128b and the second primary edge 110 to be fixed to opposite tracks 1108 that are mounted upon sidewalls 1112, 1114.

In some embodiments, one or more, or all of the plurality of ribs 156 may be relatively square or rectangular in cross-section. In some embodiments, some ribs 156 may have chamfered or angled sidewalls 166, such as, as shown in FIGS. 1 and 4. The chamfered or angled sidewalls 166 of these ribs 156 may provide extra clearance for the straps to be moved with respect to the first panel 102 when installing the panel 102, or may provide space for introducing the straps into the spaces defined by the brackets when installing the panel 102.

In some embodiments, the engaging portions 140 of the brackets that are disposed along the same line parallel to the first and second primary edges 108, 110 and on opposite sides of the secondary centerline 134 may be disposed equidistant from the secondary centerline 134. For example, as shown in FIGS. 1-2, the engaging portions 140 of the brackets 130a and 132a are each disposed a first distance 168 from the secondary centerline 134, and the engaging portions 140 of the brackets 130b and 132b are each disposed a second distance 170 from the secondary centerline 134. The first distance 168 and the second distance 170 may be the same or may be different.

Figure 6:
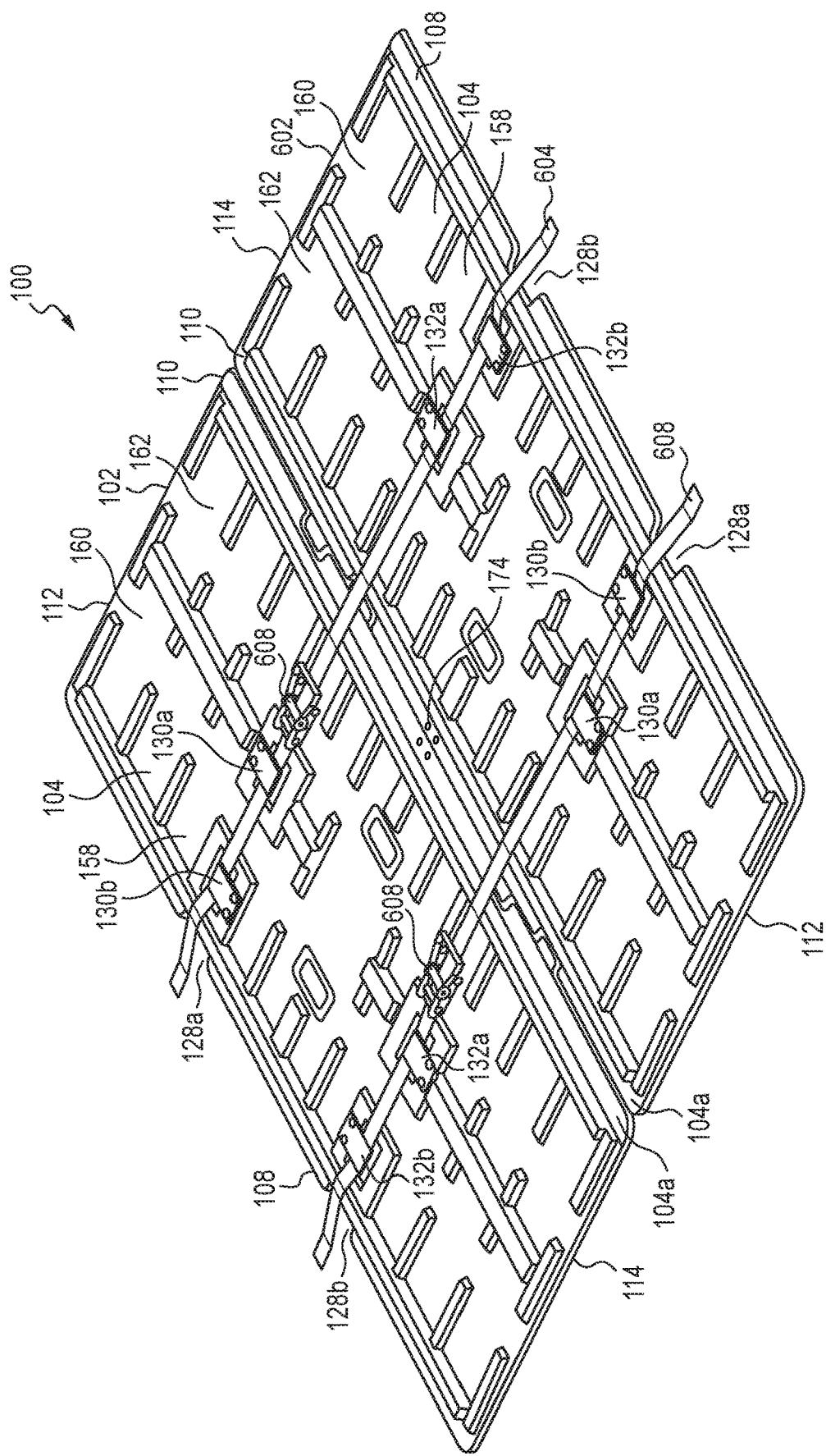
FIG. 6 is a perspective view of a bulkhead formed by two panels of FIG. 1.
Figure 7:
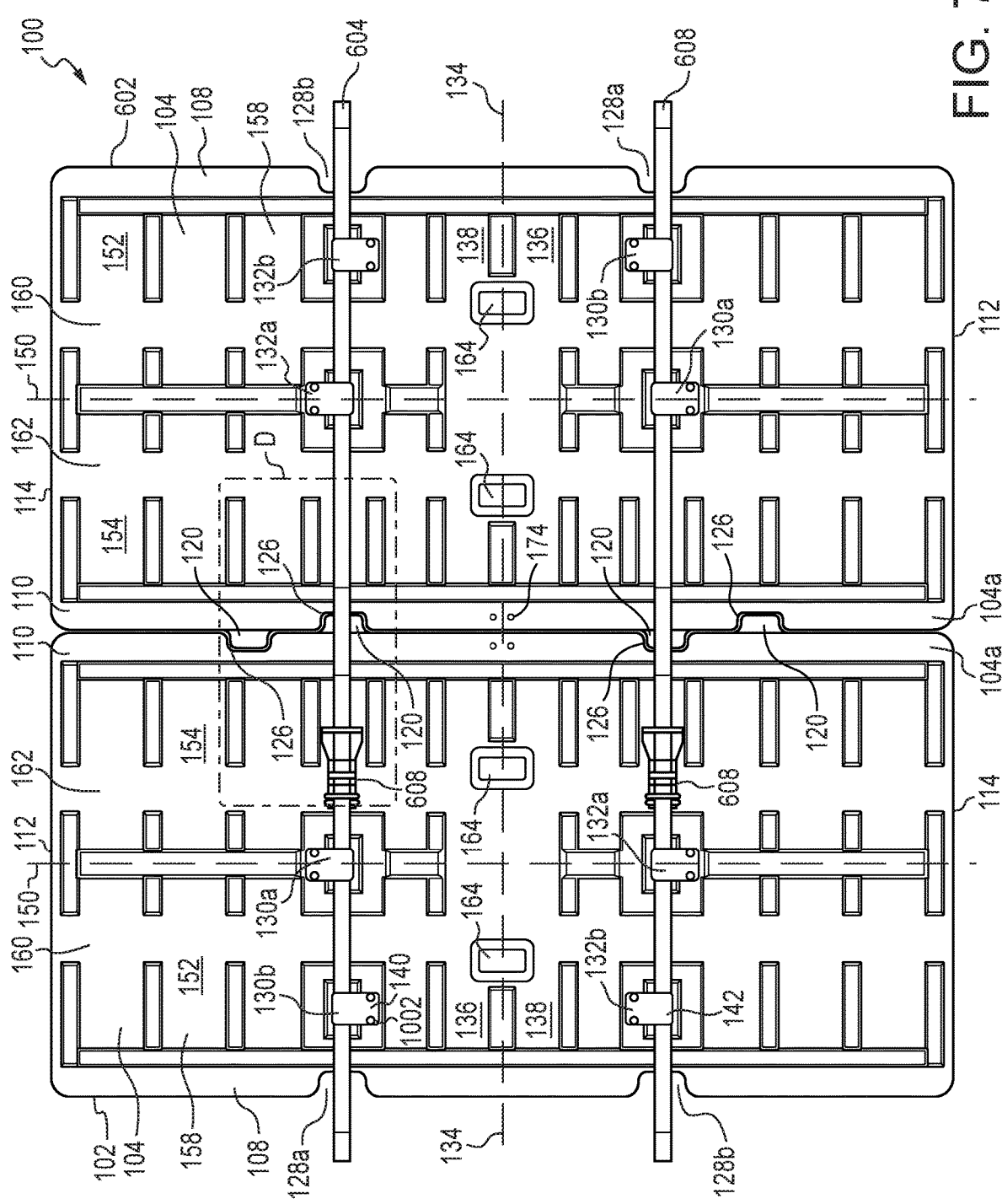
FIG. 7 is a front view of the bulkhead of FIG. 6.

In some embodiments, the first line 202 and the second line 204 may be disposed equidistant from the primary centerline 134, such that the first line 202 of the first panel 102 and the second line 204 of the second panel 602 (like the first panel 102) are aligned along the first line 202 of the first panel 102 when the second panel 602 is disposed adjacent to and aligned with the first panel 102, and the second panel 602 is positioned such that the second primary edge 110 of the second panel 602 is adjacent to the second primary edge 110 of the first panel 102, with first sides 104 of each of the first and second panels 102, 602 extending along a same plane, and the first secondary edge 112 of the first panel 102 aligned collinearly with the second secondary edge 114 of the second panel 602. When the first panel 102 and the second panel 602 are installed in the above side by side manner to form the bulkhead 100, for example as shown in FIGS. 6-7 and 11, the above configuration allows the first strap 604 to be received by the first plurality of brackets 130 of the first panel 102 and the second plurality of brackets 132 of the second panel 602, such that the first strap 604 extends along the first line 202 of the first panel 102 and the second line 204 of the second panel 602 and extends beyond the first cutout 128a of the first panel 102 and the second cutout 128b of the second panel 602 to be fixed to tracks mounted on sidewalls 1112, 1114. This configuration also allows the second strap 606 to be received by the second plurality of brackets 132 of the first panel 102 and the first plurality of brackets 130 of the second panel 602, such that the second strap 606 extends along the second line 204 of the first panel 102 and the first line 202 of the second panel 602 and extends beyond the second cutout 128b of the first panel 102 and the first cutout 128a of the second panel 602 to be fixed to tracks mounted on sidewalls 1112, 1114. When the panel(s) is installed vertically within the environment 1100, the combination of different orientations of the cantilevered portions of the brackets prevents the panel(s) from moving in at least one longitudinal direction with respect to the strap(s) (either toward or away from the ceiling when installed in a cargo environment), and in some embodiments prevents the panel(s) from rotating about the length of the strap(s).

One of ordinary skill in the art will understand that the panel(s) when installed vertically as a bulkhead 100 with the straps associated with the first and second rows of brackets 130, 132 being fixed to tracks mounted on sidewalls 1112, 1114 of the environment 1100, the panel(s) (and the bulkhead 100) are only free to slide in a direction that is parallel to the length of the straps or in other words, in a direction parallel to the first and second secondary edges 112, 114. Because the bulkhead 100 (and specifically the panel(s) that form the bulkhead 100) is normally sized with a width that is only slightly less than the width of the environment (such as most only a few inches), the range of potential sliding in this direction is minimized. Also, in some embodiments the weight of the panel(s) and the friction between the surface of the panel(s) and the surfaces of the cantilevered portions 142 of the brackets 130, 132 (at least the first row of brackets 130 and potentially within the second row of brackets 132) and the straps may result in the actual sliding of an installed bulkhead being minor, or nonexistent. In some embodiments, the straps that interact with the brackets may be capable of being locked in place upon the sidewalls 1112, 1114 of the environment 1100, which prevents the straps from being removed or repositioned within the environment 1100, and locking the straps effectively locks the bulkhead 100 in position as well.

One of ordinary skill in the art will understand with a thorough review of this specification that the number of rows of brackets, the number of columns of brackets, the number of brackets disposed in a row (along a direction parallel to the secondary centerline 134) and in a column (along a direction parallel to the primary centerline 150), the positioning of the brackets, and the orientation of the cantilevered portions of the brackets with respect to the secondary centerline 134 may be varied as desired and/or needed.

The second primary edge 110 of the first panel 102 may include at least a first plurality of fingers 116 and a second plurality of fingers 118. Each finger of the first plurality of fingers 116 includes a first tongue 120 and a first groove 122. The first tongue 120 extends from a first side 104a of the second primary edge 110 and away from the primary centerline 150. The first groove 122 extends from a second side 106a of the second primary edge 110 and toward the primary centerline 150. Each finger of the second plurality of fingers 118 includes a second tongue 124 and a second groove 126. The second tongue 124 extends from the second side 106a of the second primary edge 110 and away from the primary centerline 150. The second groove 126 extends from the first side 104a of the second primary edge 110 and toward the primary centerline 150.

In some embodiments, the fingers each are about half of the thickness of the first panel 102. In other words, the first tongues 120 and the second tongues 124 each have a tongue thickness that is about half of the thickness of the first panel 102, and the first grooves 122 and the second grooves 126 each have a groove thickness that is about half of the thickness of the first panel 102.

In some embodiments, the number of fingers from the first plurality of fingers 116 and the number of fingers from the second plurality of fingers 118 are the same. In some embodiments, the number of fingers from the first plurality of fingers 116 that are disposed on a side of the secondary centerline 134 equals the number of fingers from the second plurality of fingers 118 that are disposed on the opposite side of the secondary centerline 134. For example, as shown in FIGS. 1-2, the two fingers from the first plurality of fingers 116 are disposed on opposite sides 136, 138 of the secondary centerline 134 and the two fingers from the second plurality of fingers 118 are disposed on opposite sides 136, 138 of the secondary centerline 134. The plurality of fingers 116, 118 may be disposed on different positions along the second primary edge 110 of the panel. In some embodiments, each of the fingers from the first plurality of fingers 116 disposed on one side of the secondary centerline 134 corresponds to a respective finger from the second plurality of fingers 118 disposed on the opposite side of the secondary centerline 134, with the corresponding fingers from the first and second plurality of fingers 116, 118 disposed equidistant from the secondary centerline 134. This configuration allows the fingers from the first plurality of fingers 116 to be aligned with the respective fingers from the second plurality of fingers 118 of a neighboring panel when the second panel 602 (like the first panel 102) is disposed adjacent to and aligned with the first panel 102, and the second panel 602 is positioned such that the second primary edge 110 of the second panel 602 is adjacent to the second primary edge 110 of the first panel 102, with first sides 104 of each of the first and second panels 102, 602 extending along a same plane, and the first secondary edge 112 of the first panel 102 aligned collinearly with the second secondary edge 114 of the second panel 602.

In some embodiments, the first groove 122 is configured to receive a projection shaped like the second tongue 124, and the second groove 126 is configured to receive a projection shaped like the first tongue 120. This configuration allows a bulkhead 100 to be assembled using a first panel 102 and a second panel 602 (like the first panel 102) with the first grooves 122 of the first and second panels 102, 602 each are receiving the respective second tongues 124 from the other panel and the second grooves 126 of the first and second panels 102, 602 each are receiving the respective first tongues 120 of the other panel. To assemble the bulkhead 100, a second panel 602 like the first panel 102 is disposed adjacent to and aligned with the first panel 102, and the second panel 602 is positioned such that the second primary edge 110 of the second panel 602 is adjacent to, and may or may not be in contact with, the second primary edge 110 of the first panel 102, with first sides 104 of each of the first and second panels 102, 602 extending along a same plane, and the first secondary edge 112 of the first panel 102 aligned collinearly with the second secondary edge 114 of the second panel 602. Then the two panels 102, 602 are connected to each other by the plurality of fingers 116, 118 from the neighboring panels resting on top of each other and collectively constituting the thickness of the panel. In other words, when the connection between the fingers are made, the upper surfaces of the tongues and the surfaces of the respective neighboring panels will be substantially co-planar.

Figure 7A:
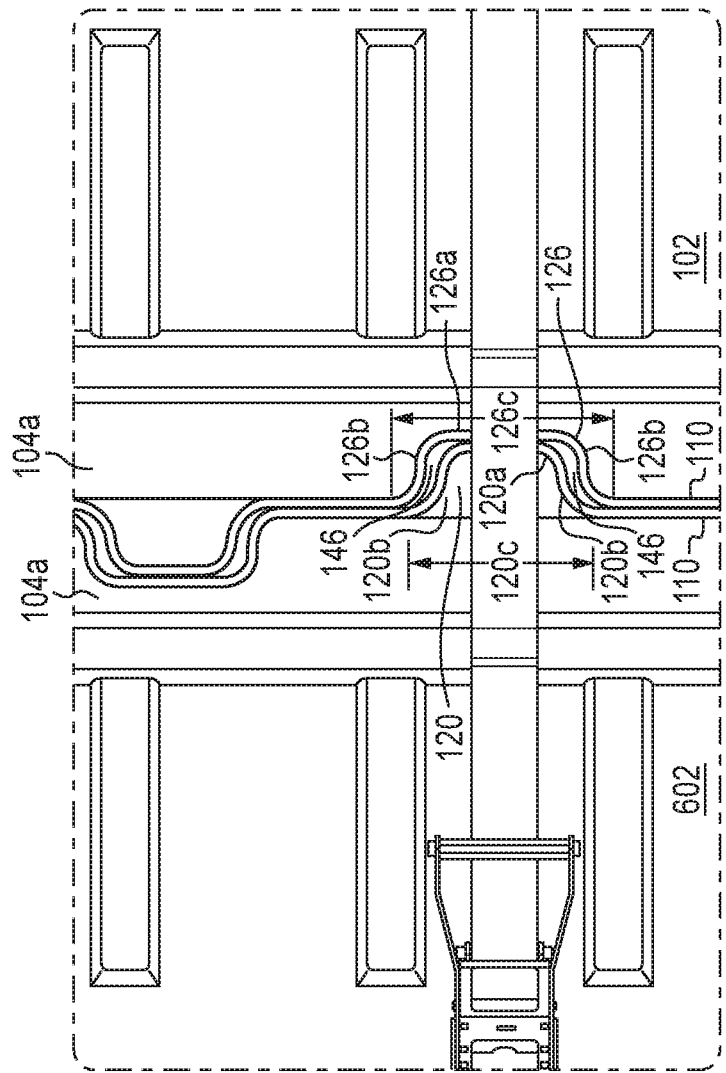
FIG. 7A is a front detail view of detail D of FIG. 7

In some embodiments, as shown in FIGS. 1-7, the tongues and the grooves have similar shapes of trapezoids with chamfered or angled surfaces extending between the end or base portions of the tongues and the grooves and the respective portions of the second primary edges. For example, as shown in FIG. 7A, the first tongue 120 includes an end portion 120a that is parallel to the second primary edge 110 of the second panel 602. The first tongue 120 also includes chamfered surfaces 120b that extend from the end portion 120a to meet with the second primary edge 110 of the second panel 602, giving the second primary edge 110 of the second panel 602 a generally convex shape. The length of the end portion 120a is slightly less than the length of the edge portion 120c connected to the chamfered surfaces 120b. The second groove 126 includes a base portion 126a that is parallel to the second primary edge 110 of the first panel 102. The second groove 126 also includes chamfered surfaces 126b that extend from the base portion 126a to meet with the second primary edge 110 of the first panel 102, giving the second primary edge 110 of the first panel 102 a generally concave shape. The length of the base portion 126a is slightly less than the length of the edge portion 126c connected to the chamfered surfaces 126b. The length of the base portion 126a of the second groove 126 is slightly larger than the length of the end portion 120a of the first tongue 120, and the length of the edge portion 126c of the first panel 102 is slightly larger than the edge portion 120c of the second panel 602. In this configuration, when the first tongue 120 is received by the second groove 126, the end portion 120a will engage the base portion 126c, and gaps 146 will be formed between chamfered surfaces 120b and 126b. The gaps may provide clearance for the tongues to be inserted into the respective grooves when installing the bulkhead, and may also provide space to allow for swelling of the panels in the finger areas due to moisture without resulting in internal stresses that would otherwise cause buckling of the joint. In some embodiments, the tongues and the grooves are configured and sized such that when the end portion 120a of the first tongue 120 engages the base portion 126a of the second groove 126, the second primary edges 110 of the first and second panels 102, 602 will engage each other with gaps being formed between the chamfered surfaces 120b, 126b. In some embodiments, all the tongues and grooves are constructed in the same manner as discussed above, thereby by inserting each of the first tongues 120 into a respective second groove 126, each of the second tongues 124 will be automatically inserted into a respective first groove 122, with each end portion of the first and second tongues engaging a respective base portion of the second and first grooves.

The engagement between the plurality of fingers 116, 118 of the first and second panels 102, 602 provides stability to the bulkhead 100 when the bulkhead 100 is installed vertically, as shown in FIG. 11. When the bulkhead 100 is installed vertically within the environment 1100, the engagement between the respective fingers from the first and second panels 102, 602 prevents the panel(s) from moving in at least one longitudinal direction with respect to each other (either toward or away from the ceiling when installed in a cargo environment), and in some embodiments prevents the panel(s) from rotating about the longitudinal direction. One of ordinary skill in the art will understand with a thorough review of this specification that the number and arrangement of the fingers from the first and second plurality of fingers 116, 118 may be varied as desired and/or needed. For example, the engagement between more fingers from two panels that are used to form the bulkhead 100 may provide more stability to the bulkhead 100 when installed vertically.

Figure 9:
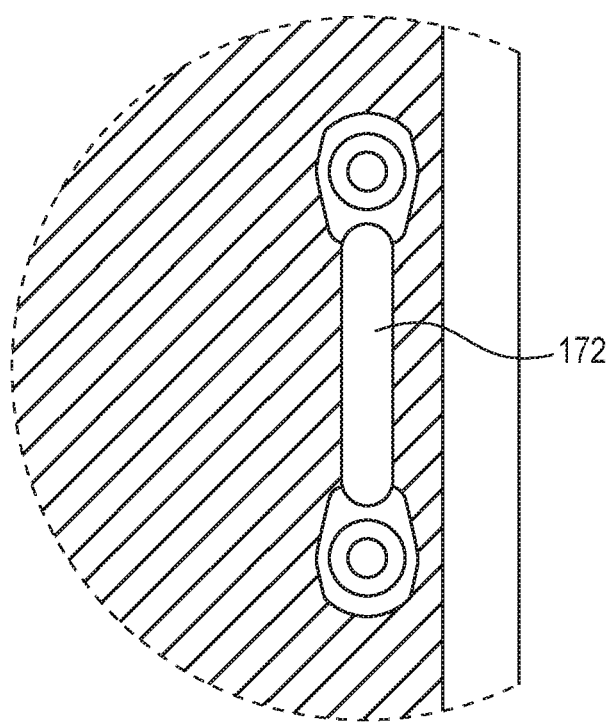
FIG. 9 is a detail view of detail F of FIG. 2.
Figure 10:
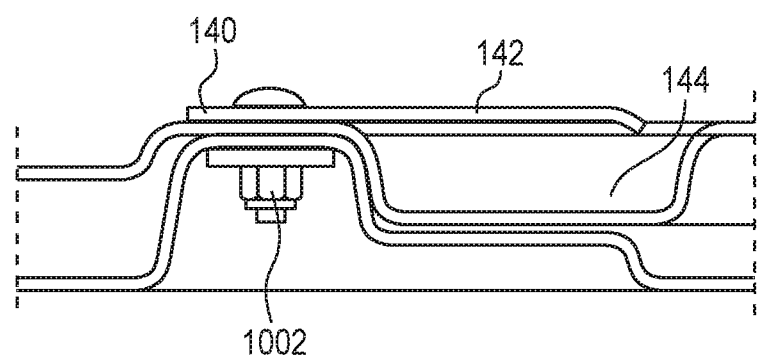
FIG. 10 is a cross-sectional view of section B-B of FIG. 2.

In some embodiments as shown in FIG. 9, the panel 102 may include at least one security bracket 172, which may be disposed upon the second primary edge 110, such as disposed on a third side 107 that is perpendicular to both of the first and second sides 104, 106 of the first panel 102, or disposed on the first side 104 as shown in FIG. 11. In embodiments where the second primary edge 110 has only one security bracket 172 (e.g., as shown in FIGS. 1-2 and 6-7, where the security bracket 172 is not shown, while the holes 174 for installing the security bracket 172 are shown), the security bracket 172 may be disposed on the secondary centerline 134 such that the security bracket 172 is disposed equidistant from the first and second secondary edges 112, 114. In this configuration, when the two panels 102, 602 are disposed vertically to form the bulkhead 100 (as discussed elsewhere), the security brackets 172 on the panels 102, 602 are adjacent to each other, which allows a short security cable (not shown in the figures) to loop around both of the security brackets 172 to add security and stability to the panels.

In some embodiments, at least a fastener may be attached to each of the straps. The fastener may move along the length of the respective strap and may adjust the length of the strap to accommodate the distance between opposite tracks 1108 mounted on opposite sidewalls 1112, 1114. In some embodiments, when two panels are installed together to form the bulkhead 100, the bulkhead fasteners 608 may be positioned to allow them to move along the length between two adjacent brackets that are installed on the two panels 102, 602 respectively. For example, as shown in FIG. 7, the bulkhead fasteners 608 are disposed on the second side 154 of the primary centerline 150 of the first panel 102, and can move along the length of the strap 604 between the two primary centerlines 150 of the two panels 102, 602, such that the bulkhead fasteners 608 will not interfere with any brackets of the two panels.

While the preferred embodiments of the disclosed have been described, it should be understood that the invention is not so limited and modifications may be made without departing from the disclosure. The scope of the disclosure is defined by the appended claims, and all devices that come within the meaning of the claims, either literally or by equivalence, are intended to be embraced therein.

The invention claimed is:

1. A bulkhead, comprising:
a first panel with a first side and a second side, the first side and second side fixed together, wherein the first panel extends to parallel first and second primary edges and parallel first and second secondary edges, opposite ends of the first and second primary edges each meet an end of one of the first and second secondary edges, and each of the first and second primary edges is disposed perpendicular to each of the first and second secondary edges;
wherein the first primary edge includes a plurality of cutouts;
wherein the second primary edge includes a first plurality of fingers and a second plurality of fingers, each of the first plurality of fingers includes a first tongue extending from a first side of the second primary edge and away from a primary centerline that extends in parallel to and centered between the first and second primary edges, each of the first plurality of fingers includes a first groove extending from a second side of the second primary edge and toward the primary centerline, each of the second plurality of fingers includes a second tongue extending from the second side of the second primary edge and away from the primary centerline, each of the second plurality of fingers includes a second groove extending from the first side of the second primary edge and toward the primary centerline;
wherein the first groove is configured to receive a projection shaped like the second tongue when a second panel like the first panel is disposed adjacent to and aligned with the first panel, and the second groove is configured to receive a projection shaped like the first tongue when the second panel like the first panel is disposed adjacent to and aligned with the first panel;
wherein the first side of the first panel supports a first plurality of brackets and a second plurality of brackets;
wherein each of the first plurality of brackets and the second plurality of brackets includes an engaging portion that contacts the first side of the first panel and a cantilevered portion that establishes a space between the first side of the first panel and the cantilevered portion.

2. The bulkhead of claim 1, wherein the first and second tongues each have a tongue thickness that is about half of a thickness of the first panel, and the first and second grooves each have a groove thickness that is about half of the thickness of the first panel.

3. The bulkhead of claim 1, wherein at least one of the first plurality of fingers and at least one of the second plurality of fingers are disposed on a first side of a secondary centerline of the first panel that is parallel to the first and second secondary edges, and at least one of the first plurality of fingers and at least one of the second plurality of fingers are disposed on a second side of the secondary centerline that is opposite from the first side of the secondary centerline.

4. The bulkhead of claim 1, wherein when the second panel like the first panel is disposed adjacent to and aligned with the first panel, the second panel is positioned such that a second primary edge of the second panel is adjacent to the second primary edge of the first panel, with first sides of each of the first and second panels extending along a same plane, and the first secondary edge of the first panel aligned collinearly with a second secondary edge of the second panel.

5. The bulkhead of claim 1, wherein at least one of the first plurality of brackets and at least one of the second plurality of brackets are disposed along the primary centerline, and at least one of the first plurality of brackets and at least one of the second plurality of brackets are disposed on a first side of the primary centerline.

6. The bulkhead of claim 5, wherein the engaging portions of the brackets of the first and second plurality of brackets that are disposed along the primary centerline each are disposed a first distance from the secondary centerline, and the engaging portions of the brackets of the first and second plurality of brackets that are disposed on the first side of the primary centerline each are disposed a second distance from the secondary centerline.

7. The bulkhead of claim 1, wherein the cantilevered portion of at least one of the first plurality of brackets extends toward the secondary centerline and the cantilevered portion of at least one of the first plurality of brackets extends away from the secondary centerline, the cantilevered portion of at least one of the second plurality of brackets extends toward the secondary centerline and the cantilevered portion of at least one of the second plurality of brackets extends away from the secondary centerline.

8. The bulkhead of claim 1, wherein each bracket of the first and second plurality of brackets is a flat plate, the engaging portion is fixed to the first side of the first panel, and the cantilevered portion extends from the engaging portion and in parallel to a planar surface of the first side of the first panel.

9. The bulkhead of claim 1, wherein each bracket of the first and second plurality of brackets is configured, in use, to selectively receive a respective first strap and a second strap therein, between the cantilevered portion and the first side of the first panel.

10. The bulkhead of claim 1, wherein the space defined by a first bracket of the first plurality of brackets is disposed between the engaging portion of the first bracket and the secondary centerline, the space defined by a second bracket of the first plurality of brackets is disposed between the engaging portion of the second bracket and the first secondary edge, the space defined by a first bracket of the second plurality of brackets is disposed between the engaging portion of the first bracket of the second plurality of brackets and the secondary centerline, and the space defined by a second bracket of the second plurality of brackets is disposed between the engaging portion of the second bracket of the second plurality of brackets and the second secondary edge.

11. The bulkhead of claim 1, wherein at least a portion of a first cutout of the plurality of cutouts and a portion of each space defined by the first plurality of brackets are aligned along a first line that is parallel to the first and second secondary edges of the first panel, and at least a portion of a second cutout of the plurality of cutouts and a portion of each space defined by the second plurality of brackets are aligned along a second line that is parallel to the first and second secondary edges of the first panel.

12. The bulkhead of claim 11, wherein a first strap received in the spaces defined by the first plurality of brackets extends across the first panel along the first line and beyond the first primary edge through the first cutout, and a second strap received in the spaces defined by the second plurality of brackets extends across the first panel along the second line and beyond the first primary edge through the second cutout.

13. The bulkhead of claim 1, wherein the first side of the first panel supports a plurality of fasteners disposed on a second side of the primary centerline that is opposite from the first side of the primary centerline.

14. The bulkhead of claim 1, wherein the first side of the first panel includes a plurality of elongate extensions disposed outwardly from a planar surface of the first side of the first panel, wherein spaces upon the planar surface between at least a portion of the elongate extensions collectively define at least two primary valleys that each extend between the first and second secondary edges and in parallel to the primary centerline.

15. The bulkhead of claim 1, wherein the first panel is configured to be fixed in a vertical orientation with the primary centerline extending vertically and the secondary centerline extending horizontally and in a second horizontal orientation wherein the primary and the secondary centerlines each extend horizontally, and wherein, in use, when the first panel is fixed in a vertical orientation, a first strap may extend above and in contact with the first plurality of brackets and a second strap may extend below and in contact with the second plurality of brackets, wherein the first panel is prevented from movement within an environment in a vertical direction and in a direction that extends perpendicularly to both the primary and secondary centerlines of the first panel.

16. The bulkhead of claim 1, wherein the first panel includes at least two slots that are aligned along the secondary centerline and disposed on opposite sides of the primary centerline.

17. A bulkhead, comprising:
  a first panel with a first side and a second side, the first side and second side fixed together, wherein the first panel extends to parallel first and second primary edges and parallel first and second secondary edges, opposite ends of the first and second primary edges each meet an end of one of the first and second secondary edges, and each of the first and second primary edges is disposed perpendicular to each of the first and second secondary edges;
  wherein the second primary edge includes a first plurality of fingers and a second plurality of fingers, each of the first plurality of fingers includes a first tongue extending from a first side of the second primary edge and away from a primary centerline that extends in parallel to and centered between the first and second primary edges, each of the first plurality of fingers includes a first groove extending from a second side of the second primary edge and toward the primary centerline, each of the second plurality of fingers includes a second tongue extending from the second side of the second primary edge and away from the primary centerline, each of the second plurality of fingers includes a second groove extending from the first side of the second primary edge and toward the primary centerline;

wherein the first groove is configured to receive a projection shaped like the second tongue when a second panel like the first panel is disposed adjacent to and aligned with the first panel, and the second groove is configured to receive a projection shaped like the first tongue when the second panel like the first panel is disposed adjacent to and aligned with the first panel;

wherein the first primary edge includes a plurality of cutouts; and wherein the first side of the first panel supports a first plurality of brackets and a second plurality of brackets, each of the first and second plurality of brackets is configured, in use, to selectively receive a respective first strap and a second strap therein.

18. The bulkhead of claim 17, wherein the first strap received by the first plurality of brackets extends across the first panel along a first line and beyond the first primary edge through a first cutout of the plurality of cutouts, and the second strap received by the second plurality of brackets extends across the first panel along a second line and beyond the first primary edge through a second cutout of the plurality of cutouts.

19. The bulkhead of claim 17, wherein when the second panel like the first panel is disposed adjacent to and aligned with the first panel, the second panel is positioned such that a second primary edge of the second panel is adjacent to the second primary edge of the first panel, with first sides of each of the first and second panels extending along a same plane, and the first secondary edge of the first panel aligned collinearly with a second secondary edge of the second panel.

20. The bulkhead of claim 17, wherein at least one of the first plurality of brackets and at least one of the second plurality of brackets are disposed along the primary centerline, and at least one of the first plurality of brackets and at least one of the second plurality of brackets are disposed on a first side of the primary centerline.

\* \* \* \* \*